Dec. 29, 1959   M. LUDWIG   2,919,239
METHOD FOR RECOVERING ASPHALTIC MATERIALS FROM AQUEOUS MIXTURES
Filed July 30, 1956
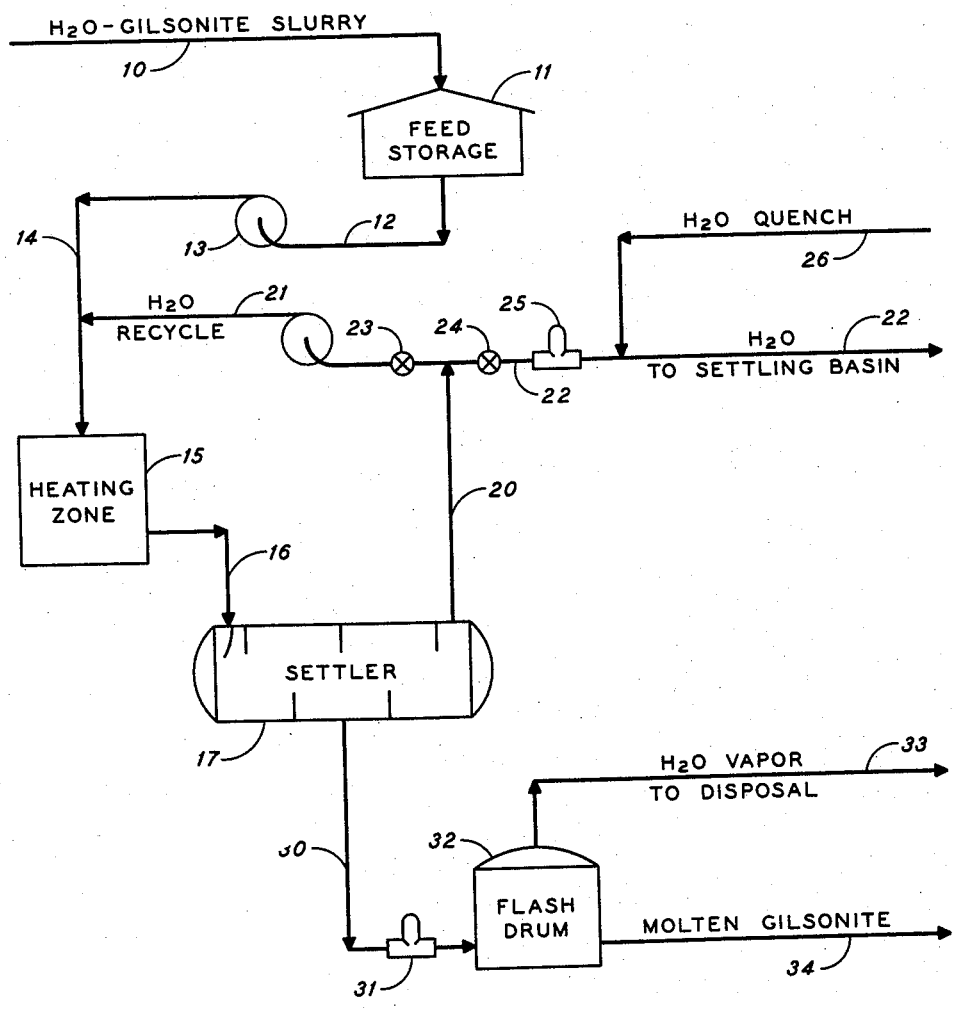
INVENTOR
MILTON LUDWIG
BY
ATTORNEYS

United States Patent Office 2,919,239
Patented Dec. 29, 1959

2,919,239

METHOD FOR RECOVERING ASPHALTIC MATERIALS FROM AQUEOUS MIXTURES

Milton Ludwig, Berkeley, Calif., assignor to Standard Oil Company of California, San Francisco, Calif., a corporation of Delaware Application July 30, 1956, Serial No. 601,047

2 Claims. (Cl. 208—39)

This invention relates to a method for recovering asphaltic materials from mixtures of said materials, in the solid state, and water.

It has been found convenient to handle various high melting, normally solid materials, such, for example, as the various natural and synthetic asphalts and asphaltites, in the form of a suspension or slurry in an aqueous vehicle. However, the recovery of these materials from the aqueous system presents serious problems, particularly when the normally solid material is to be converted or otherwise processed in the molten condition. Thus, while the solid product can be filtered from the system, the residual water content of the filter cake is still so high as to give rise to serious foaming and other hydrocarbon-entrainment difficulties as the wet material is thereafter melted or is dissolved in a hot solvent of high boiling point.

While the invention is broadly applicable, as indicated above, to the treatment of a variety of asphaltic products, it has been found to be particularly useful in the processing of aqueous slurries of an asphaltite product commonly known as gilsonite. Accordingly, the invention will be more particularly described hereinafter as it relates to the processing of water-gilsonite slurries.

The present invention is based on the discovery that a molten stream of gilsonite, or other normally solid product capable of being liquefied by heating to temperatures in the region of from about 300° to 600° F., can be obtained from a mixture of water and of said solid product present in a relatively finely divided state (commonly referred to as a slurry) by heating the slurry to a temperature sufficient to convert the solids present to a molten product while maintaining the pressure in the system at a sufficiently high level so as to prevent any appreciable vaporization of the water component of the mixture. In the case of gilsonite-water mixtures, or slurries, this can be effected by heating the mixture to a temperature above about 500° F. while maintaining the pressure in the system at a level above about 700 p.s.i.g., the pressure employed being above the vapor pressure of water at the prevailing temperature.

Despite the intimate nature of the dispersion of finely divided solid particles in the water, and of the tendency of the gilsonite or other asphaltic material to undergo some conversion when brought into the molten state, it has been found that the heated, pressurized system breaks cleanly into an upper, aqueous layer and a lower layer of the now molten product, e.g., gilsonite. Surprisingly, there is little entrainment of the respective components of the system in the adjoining layers, and no particular evidence of foam formation.

In addition to the above, it is also possible to improve the separation by adding a quantity of oil or other like solvent to reduce the final viscosity of the molten asphaltic material and thus reduce the temperature to which the system must be heated. If sufficient solvent is added to materially affect the specific gravity differential between water and gilsonite at the temperature involved, the separation may occur with the water phase on the bottom and the asphaltic phase on top.

The desired molten product is then drawn off from the liquid-liquid system, as in a settling tank or the like, and may then be passed at relatively lower pressures into a flash drum from which any residual water present is drawn off as a vapor. The water phase recovered from the settling tank can be depressured and sent to waste disposal, though a substantial portion of this phase is preferably recycled (i.e., admixed with the incoming slurry) to facilitate heating and handling of said slurry as the latter is being heated prior to being passed to a settling tank. Preferably, the amount of hot water recycled in this fashion is such as to bring the solids content of the slurry into a range of from about 5 to 20 weight percent, this in contrast to a solids content which usually ranges from about 30 to 50 percent as the slurry is being transported or otherwise handled prior to the present melting treatment.

A particular advantage of effecting separation of the asphaltic material from the water component of the slurry in the fashion described above lies in the economy of the heating operation. That is to say, it has been found that the present method requires less heat than would otherwise be required if the water of the feed were to be driven off by vaporization.

The manner in which the present invention may be practiced can be illustrated by reference to the figure of the appended drawing which is a simplified flow scheme of a refinery unit adapted for using the process. For the sake of greater clarity, the figure is described below in the example wherein details are given of a gilsonite recovery operation.

*Example*

In this operation, a water (60%)-gilsonite (40%) slurry is supplied to the unit of the figure, through line 10, at a temperature of about 40° F. and at a rate of 1000 parts per operating day. The incoming slurry in line 10 normally passes into a storage tank 11 from which a stream of approximately the same composition is withdrawn through line 12 for passage through pump 13 which raises the pressure of the slurry leaving the pump via line 14 to the desired level of 700 p.s.i.g. or higher, the pressure in this example being 1100 p.s.ig. The pressurized slurry in line 14 (preferably diluted to a solids content of from about 5 to 20% by admixture with hot, pressurized, recycle water from line 21) is now passed through a heating zone 15 where the temperature of the mixture is brought to a level sufficient to melt the gilsonite or other solid present and to impart the desired degree of fluidity to the resulting nonaqueous liquid phase. Zone 15 may comprise a conventional furnace wherein the dilute slurry is passed through tubular elements, or it may comprise some other type of heat exchange unit. However, in the case of a conventional tubular furnace, it has unexpectedly been found that in the case of water-gilsonite slurries, greatly improved results are obtained as the solids content of the slurry is held between about 5 to 20%. Above this figure, the system, while operable, tends to build up more or less viscous deposits on the internal tube surfaces, thereby impairing the heating capacity of the furnace and cutting down on the rate at which fresh slurry may be passed therethrough.

From the heating zone 15, the liquid-liquid product stream (now, in the process of this example, at a temperature of 550° F. and a pressure of 1100 p.s.i.g.) is passed through line 16 to a settler 17 from which an upper, aqueous layer is taken through line 20, while a molten gilsonite stream is recovered via line 30.

The aqueous component withdrawn through line 20

(which is still in the liquid phase) can be in part recycled through line 21, or it may be entirely removed from the system via line 22, as determined by the settings of valves 23 and 24. However the stream is divided, the liquid phase in line 22 (which is discharged at a rate of 555 parts per operating day, and which contains but about 0.1% oil and residue) is passed through a pressure reducing valve 25 and is thereafter quenched by an incoming water stream in line 26. The resulting material is then disposed of in any convenient fashion.

The molten product in line 30 (at 550° F. and 1100 p.s.i.g.) is passed through a pressure reducing valve 31 and from there to a flash drum 32 operated at about 50 p.s.i.g. From this drum an overhead stream made up of water vapor at about 310° F. is taken overhead at a rate of about 45 parts per day, while a molten bottoms stream is recovered through line 34 at a rate of approximately 40% of the slurry feed. The latter stream comprises the desired molten gilsonite product, and can be handled thereafter as economic and marketing conditions may require. Thus, the product may be used as such for various product applications. Alternatively, the molten product may be coked or otherwise converted to produce lighter hydrocarbon products such as gasoline and naphtha. Coking, for example, can be practiced either by introducing the molten gilsonite stream into the furnace or by dissolving the molten gilsonite in a relatively heavy oil such, for example, as a recycle oil from the coker. In this case, the resulting oil solution is then passed to the coking furnace.

The various parts and percentages employed herein are on a weight basis, unless otherwise indicated. It should also be noted that in presenting the flow scheme of the appended drawing, various conventional items of equipment such as certain valves, pumps, heat exchangers and the like have been omitted in the interests of simplicity and greater clarity.

I claim:

1. A process for recovering gilsonite from a mixture of water and particles of solid gilsonite, said process comprising passing the mixture to a heating zone of the tubular, heat exchanger type and there bringing said mixture to a temperature of at least 500° F. while maintaining the mixture under a pressure greater than the vapor pressure of water at the temperature in the heating zone; maintaining said pressure while allowing the resultant molten gilsonite product to form a layer separate from the water layer in a settling zone; withdrawing the molten gilsonite layer and the water layer so obtained as separate streams from the settling zone; and adjusting the solids content of the mixture passing to the heating zone to a solids concentration of from about 5 to 20% by recycling to said mixture a portion of the hot water layer removed from the settling zone, said recycled water portion and the resultant water-gilsonite mixture of adjusted concentration being maintained under substantially the same pressure conditions as those prevailing in the settling zone.

2. The process of claim 1, wherein the molten gilsonite withdrawn from the settling zone is reduced in pressure and passed to a flash drum from which the residual water content of said gilsonite is removed overhead, while the molten gilsonite is discharged as a bottoms product stream from said drum.

References Cited in the file of this patent

UNITED STATES PATENTS

| | | |
|---|---|---|
| 435,198 | Alexander | Aug. 26, 1890 |
| 1,123,502 | Dubbs | Jan. 5, 1915 |
| 1,703,103 | Egloff et al. | Feb. 26, 1929 |
| 1,881,968 | Pier et al. | Oct. 11, 1932 |
| 1,901,238 | Harcourt | Mar. 14, 1933 |
| 2,235,639 | Koch | Mar. 18, 1941 |
| 2,368,497 | Shipley et al. | Jan. 30, 1945 |
| 2,446,040 | Blair | July 27, 1948 |
| 2,493,507 | Sutherland | Jan. 3, 1950 |
| 2,614,133 | Ockert | Oct. 14, 1952 |
| 2,775,541 | Karl | Dec. 25, 1956 |